United States Patent [19]
Smith et al.

[11] Patent Number: 5,784,185
[45] Date of Patent: Jul. 21, 1998

[54] OPTICAL NETWORK

[75] Inventors: Kevin Smith; Julian K. Lucek; Danny R. Pitcher; Terence Widdowson; David G. Moodie, all of Ipswich, England

[73] Assignee: British Telecommunications public limited company, London, England

[21] Appl. No.: 699,657

[22] Filed: Aug. 19, 1996

[30] Foreign Application Priority Data

Feb. 26, 1996 [GB] United Kingdom ............ 9604020

[51] Int. Cl.$^6$ .................................................... H04J 14/08
[52] U.S. Cl. ........................................... 359/136; 359/189
[58] Field of Search .................... 359/136, 139–140, 359/158, 189, 192–193; 370/321, 337, 347; 250/227.12

[56] References Cited

U.S. PATENT DOCUMENTS

| | | | |
|---|---|---|---|
| 4,427,895 | 1/1984 | Eng | 250/551 |
| 4,991,975 | 2/1991 | Alferness et al. | 455/606 |
| 5,353,143 | 10/1994 | Clarke | 359/135 |

FOREIGN PATENT DOCUMENTS

| | | |
|---|---|---|
| 0555063 A2 | 8/1993 | European Pat. Off. . |
| 0593206 A1 | 4/1994 | European Pat. Off. . |

OTHER PUBLICATIONS

Patent Abstracts of Japan, vol. 009, No. 056 (E–302), 12 Mar. 1985 & JP 59 198033 A (Nippon Denshin Denwa Kosha), 9 Nov. 1984.

*Primary Examiner*—Kinfe-Michael Negash
*Attorney, Agent, or Firm*—Nixon & Vanderhye P.C.

[57] ABSTRACT

A receiver at a node in an optical network receives an optical clock signal and an OTDM datastream. A detector converts the clock signal to the electrical domain. A variable delay stage applies a selected delay to the clock signal in the electrical domain. A non-linear electro-optic modulator which may be an electro-absorption modulator, receives the OTDM datastream at its optical input. An electrical control input of the modulator is connected to the output of the variable delay stage. The electro-optic modulator outputs an OTDM channel selected by setting the delay of the variable delay stage. The variable delay stage may include a number of logic gates, particularly AND gates, connected between a pair of microstrip delay lines. The gates are controlled to provide different paths with different corresponding delay times for the clock signal.

19 Claims, 5 Drawing Sheets

OPTICAL NETWORK

BACKGROUND OF THE INVENTION

1. Field of the Invention

The present invention relates to an optical network for carrying TDMA (Time Division Multiple Access) signals and particularly to receivers for use in nodes of such a network.

2. Related Art

A network embodying the present invention might be used, for example, as a local area network (LAN) for interconnecting computer systems. The increasing power of computer systems in terms of processor speeds and storage capacity has made it possible for conventional personal computers to handle multimedia applications involving real time video and animation and computer graphics. The high bandwidth data associated with such applications place heavy demands on the network and the performance of conventional LANs has failed to keep pace.

An optical network using synchronous TDMA potentially offers a far higher bandwidth, and so might be used as a high speed LAN to replace a conventional LAN. However, in existing optical networks, while signal transmission has been carried out in the optical domain, in practice some electronic circuits have been required for such functions as channel selection. It has been recognised that such electronic components of the network infrastructure constitute a bottleneck restricting the performance of the network.

"A High Speed Broadcast and Select TDMA network Using All-Optical Demultiplexing", L P Barry et al, ECOC '95 pp 437–440, describes an experimental OTDM network. At the receivers in the network nodes, an optical clock signal is detected and a variable delay applied in the electrical domain to the detected clock signal to select a particular TDMA channel. After pulse shaping, the signal is taken back into the optical domain by driving a local optical source, a DFB laser, which produces an optical signal for use in a subsequent all-optical switching stage.

The paper by Prucnal et al, "Ultrafast all-optical synchronous multiplex access fibre networks", IEEE Journal on Selected Areas in Communications, SAC-4, no. 9, December 1986 proposes an alternative approach in which different delays, and hence different TDMA channels, are selected in the optical domain. The optical signal is split between different paths each having a different characteristic delay and an electro-optic gate in each path is controlled so that the signal passes only through the path having the desired delay.

SUMMARY OF THE INVENTION

According to a first aspect of the present invention, there is provided a receiver for a node in an optical network comprising an input for an optical clock signal, a detector for converting the clock signal to the electrical domain, a variable delay stage for applying a selected delay to the clock signal in the electrical domain, and a non-linear electro-optic modulator having an optical input arranged to receive a TDMA datastream and an electrical control input connected to the output of the variable delay stage, in use the electro-optic modulator outputting an TDMA channel selected by setting the delay of the variable delay stage.

Preferably the electro-optic modulator is an electro-absorption modulator (EAM).

The present inventors have found that significant advantages can be achieved by combining channel selection in the electrical domain with the use of an electro-optic switch with a fast non-linearity to read the selected channel. In particular, relatively high switching rates can be achieved without the power losses typically associated with all-optical channel selection. It is found to be particularly advantageous to use an EAM. The fast response time of such a device makes possible a switching window as short as a few picoseconds. The receiver as a whole is therefore capable of operating at bit rates of 40 Gbit/s or higher.

Preferably the receiver includes means for separating the clock signal in the optical domain from the received TDMA datastream. Preferably the said means for separating comprise a polarising beam splitter, in use the clock signal being marked by a different polarisation state to the TDMA datastream.

Preferably a first output of the means for separating is connected to the optical input of the electro-optic modulator, in use TDMA data passing from the first output to the modulator, and a second output of the means for separating is connected to the detector, in use optical clock signals passing from the second output to the detector.

Preferably an impulse generator is connected between the output of the variable delay stage and the control input of the electro-optic modulator.

The electro-optic modulator may require a drive signal having somewhat shorter pulses than those output by the delay stage. In this case advantageously some form of pulse shaping may be used, and in particular the output of the delay stage may be applied to an electrical impulse generator. This may be a device using step recovery diodes to generate short electrical pulses from a sine wave.

Preferably the variable delay stage comprises a plurality of logic gates, means connecting a first input of each gate to an input path for the clock signal, control means connected to a second input of each gate, and means connecting outputs of the gates in common to an output path for the delayed clock signal, the said means connecting inputs and outputs of the gates to respective input and output paths being arranged to provide paths of different respective lengths via different gates, in use the control means applying control signals to the gates to select a path and a corresponding delay for the clock signal.

This preferred feature of the present invention uses an array of logic gates to provide an electronic channel selector suitable for an integrated construction, and capable of quick reconfiguration. This channel selector is not limited in applicability to receivers in accordance with the first aspect of the present invention, but may be used with other receiver designs, or in node transmitters. In particular, it may be combined with a local optical source in a receiver in which an all-optical switch was used in place of the electro-optic modulator of the first aspect of the invention.

According to a second aspect of the present invention, there is provided a receiver for a node in an optical TDMA network comprising an input for an optical clock signal, a detector for converting the clock signal to the electrical domain, a variable delay stage for applying a selected delay to the clock signal in the electrical domain, and a switch controlled in dependence upon the delayed clock signal and arranged to select one or more channels from a TDMA data stream, characterised in that the variable delay stage comprises a plurality of logic gates, means connecting a first input of each gate to an input path for the clock signal, control means connected to a second input of each gate, and means connecting outputs of the gates in common to an output path for the delayed clock signal, the said means connecting inputs and outputs of the gates to respective input and output paths being arranged to provide paths of different respective lengths via different gates, in use the control means applying control signals to the gates to select a path and a corresponding delay for the clock signal.

Preferably at least one of the said means connecting inputs and outputs comprises a microstrip delay line. Preferably the means connecting inputs and outputs comprise a pair of microstrip delay lines and the gates are connected between the pair of microstrip delay lines.

Preferably adjacent connections to the gates on the microstrip delay line on the input side of the gates are separated by a path length corresponding to t/2 and adjacent connections on the microstrip delay line on the output side of the gates are separated by a path length corresponding to t/2, in use the gates being controlled to vary the delay by multiples of t, where t corresponds to the channel spacing in the time domain of the TDMA signal.

According to a third aspect of the present invention, there is provided a method of operating a receiver at a node of an optical TDMA network comprising receiving a TDMA datastream and an associated optical clock signal, detecting the optical clock signal thereby converting it to the electrical domain, applying a variable delay to the clock signal in the electrical domain, passing the TDMA datastream though a non-linear electro-optic modulator, and controlling the modulator in dependence upon the delayed clock signal, the modulator thereby outputting a selected one or more TDMA channels.

The present invention also encompasses an optical network incorporating a receiver in accordance with the first or second aspects and also LANs formed using such a network.

BRIEF DESCRIPTION OF THE DRAWINGS

Systems embodying the present invention will now be described in further detail, by way of example only, with reference to the accompanying drawings in which.

DETAILED DESCRIPTION OF EXEMPLARY EMBODIMENTS

Figure 1:
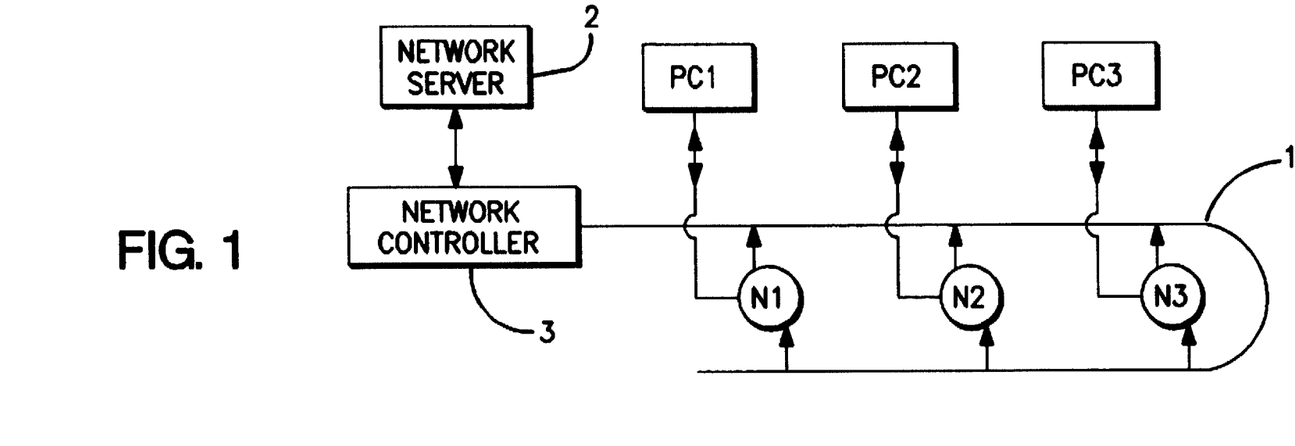
FIG. 1 is a schematic of a network embodying the present invention.
Figure 2:
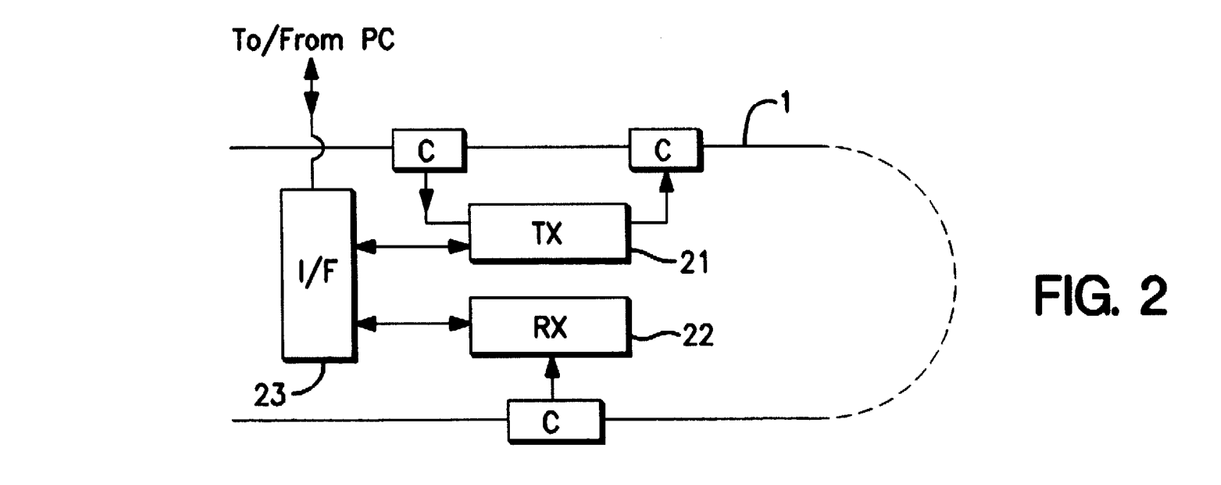
FIG. 2 is a diagram showing the structure of one of the nodes of FIG. 1.

An optical network comprises a number of nodes N1, N2, N3 . . . connected to an optical fibre bus 1. In the present example, the network is a local area network (LAN) and a number of personal computers PC1, PC2, PC3 . . . are connected via the optical fibre bus to each other and to a network server 2. Although, for clarity, only three nodes are shown, in practice the network may support many more nodes. The network uses a structure termed by the inventors a re-entrant bus topology. As seen in FIG. 2, each node includes a transmitter 21 coupled to the bus 1 at two points via couplers C and a receiver 22 coupled to the fibre bus 1 at a point downstream from the transmitter via another coupler C. The transmitter 21 and receiver 22 are coupled to the respective personal computer by an electronic interface 23.

The network operates using a synchronous TDMA (time division multiple access) protocol. A clock stream is distributed to all users of the network thereby ensuring that each node is synchronised. A clock pulse marks the start of each frame. The frame is precisely divided into time-slots—for example slots of 10 ps duration for a 100 Gbit/s line rate. In general each node has a tuneable transmitter and tuneable receiver and can thereby transmit and receive in any of the time-slots. The granularity of the network, that is the relationship between the overall network bandwidth, and the bandwidth of individual channels, may be chosen to be relatively high so that each user has access to a relatively low speed (say 155 Mbit/s) channel from a fibre optic pipe which itself carries rates in excess of 100 Gbit/s. To minimise the costs of the electronic components required, the electronic speeds within each node are at most 2.5 Gbit/s in this example. The clock source is typically located at the network controller 3 associated with the server 2. The clock produces a regular stream of picosecond duration optical pulses at a low repetition rate, say 155 or 250 MHz, relative to the peak line rate of the optical pipe (100 Gbit/s). Such a source may be provided by a mode-locked laser or a gain-switched laser with external pulse compression. As a guideline, for a 100 Gbit/s LAN a pulse duration of around 2 ps is required whereas for a 40 Gbit/s system around 5–7 ps suffices. A pulse source suitable for operation at 100 Gbit/s or higher is disclosed and claimed in the present applicant's co-pending European Patent Application filed 16th Feb. 1996 and entitled "Optical Pulse Source" (U.S. patent application Ser. No. 08/648,611 filed May 16, 1996, now allowed). The disclosures of that earlier application are incorporated herein by reference. This pulse source may comprise a ridgewaveguide gain-switched distributed feedback semiconductor laser diode (DFB-SLD) having its output gated by an electro-absorption modulator. Continuous wave (cw) light is injected into the optical cavity of the DFB-SLD. A synchronised RF drive is applied to the DFB-SLD and to the EAM. This pulse source is shown schematically in FIG. 8.

Figure 3:
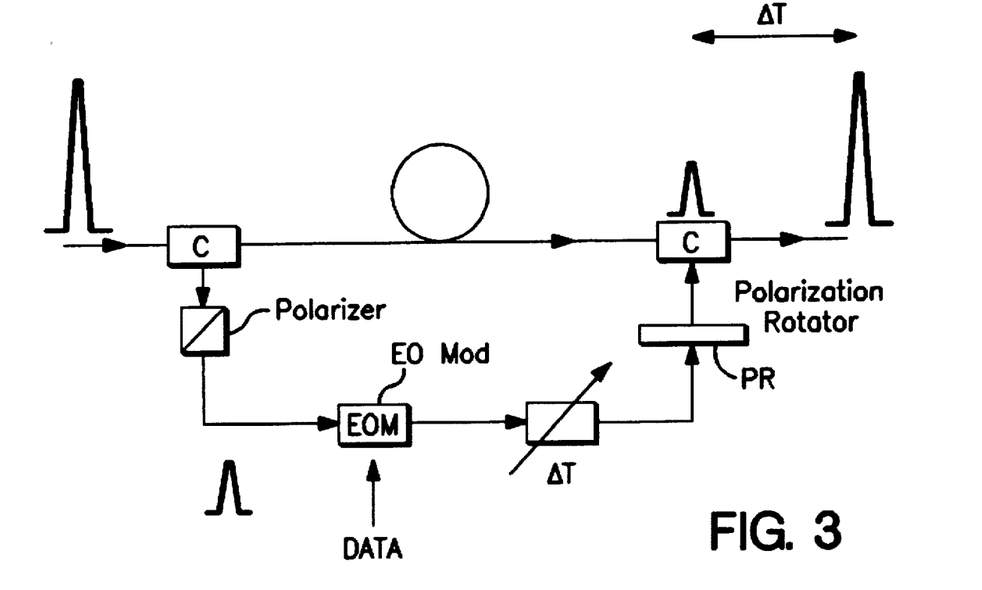
FIG. 3 is a schematic of a transmitter for use in the network of FIG. 1.

FIG. 3 shows the transmitter in one of the nodes. At the transmitter, a fraction of the distributed clock stream is split-off and then encoded via an electro-optic modulator. This may be, for example, a lithium niobate modulator such as that available commercially from United Technologies, model no. APE MZM-1.5-3-T-1-1-B/C, or an electro-absorption modulator (EAM). A suitable EAM is described in the paper by D. G. Moodie et al published at pp 1370–1371 Electron. Letts., 3 Aug. 1995, Vol 31, no. 16. The variable time delay in the transmitter then places the modulated pulse stream into the correct time slot for onward transmission. The data and clock streams must be distinguishable, and in this example polarisation is used to distinguish the clock from the rest of the frame. In the transmitter, a polariser P eliminates the possibility of data channels breaking through and being modulated in the electro-optic modulator (EOmod). The polariser need not be a separate device but might be integrated with the EO modulator. For example, the United Technologies EAM referred to above is inherently polarisation-selective in operation. The delay line provides the required delay and data pulses are inserted into the appropriate time-slot with a polarisation orthogonal to the clock stream. This polarisation rotation may be done via a simple polarisation rotator such as a retardation plate or, where polarisation maintaining fibre is used to implement the circuit, then rotation may be achieved by physically rotating the waveguide before reinserting it into the fibre optic pipe.

Figure 4:
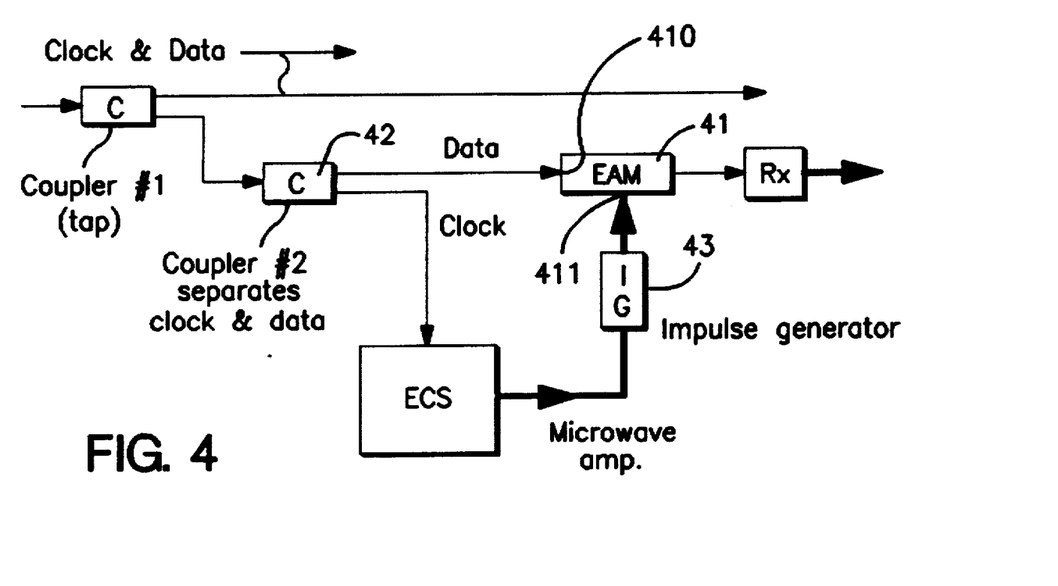
FIG. 4 is a schematic of a receiver for use in the network of FIG. 1.

At the receiver, after tapping a fraction of the light from the optical pipe, the clock and the data are separated. A polarising beam splitter (PBS) is used to perform this function. The clock and the data pulses are then forced to suffer a relative (programmable) optical delay using a variable time delay device. This means that the clock pulse can be temporally overlapped with any data pulse slot and therefore used to demultiplex or read any channel. After the channel is demultiplexed, it is converted back into the electrical domain using a receiver operating at up to 2.5 Gbit/s, the allocated bandwidth per user.

Figure 5:
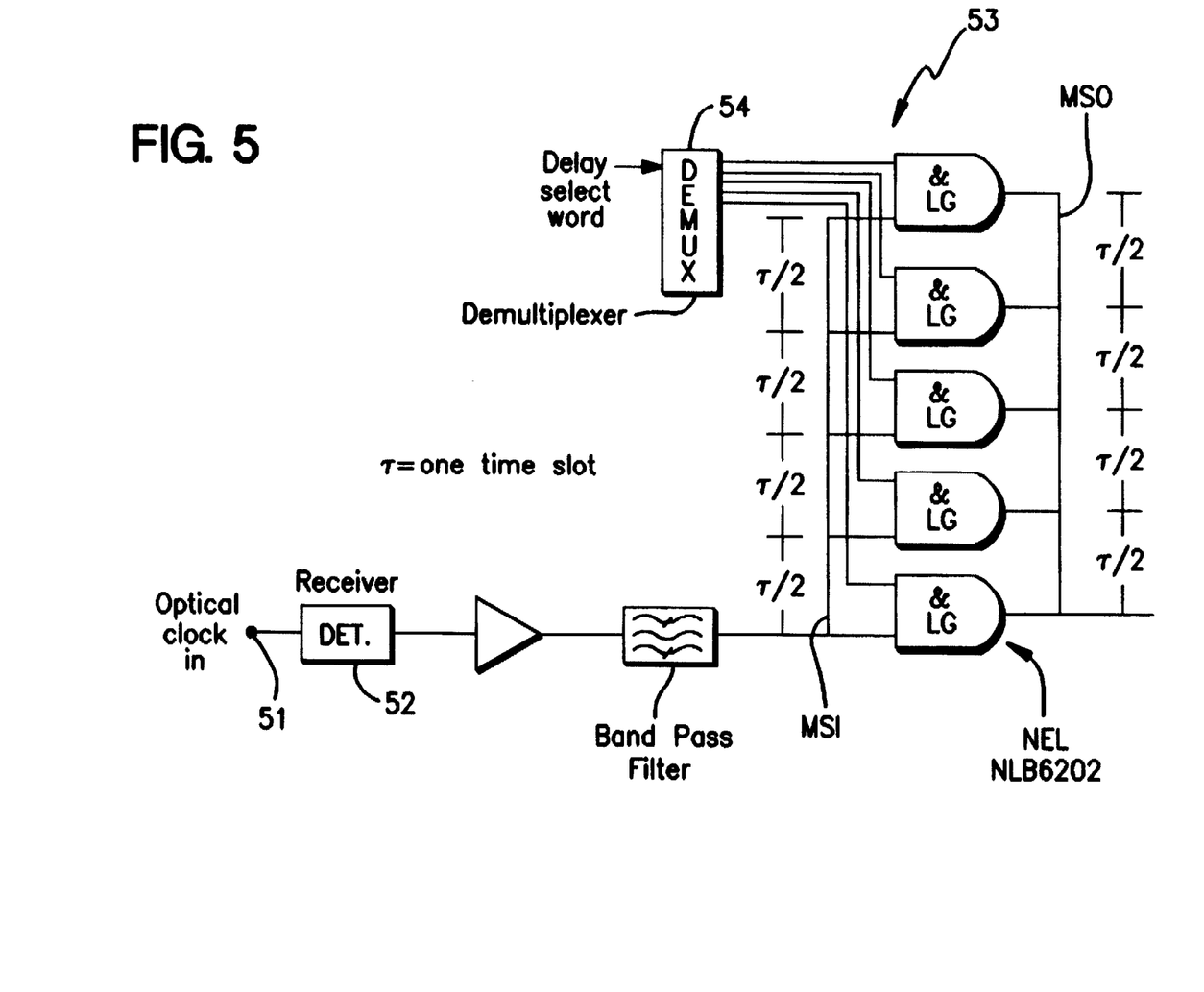
FIG. 5 is a circuit diagram for an electrical channel selector.

FIG. 4 shows in detail the structure of the receiver and in particular shows how an electrical channel selector (ECS) is used to provide a signal which, after suitable amplification and shaping drives an electro-absorption modulator (EAM). The electrical channel selector (ECS) is shown in FIG. 5. The optical LAN clock is first detected using a detector 52 which might be, for example, a PIN photodiode. After amplification, the signal is filtered to generate a clean electrical sine wave. The signal is then input to delay stages 53 comprising a series of electrical AND gates LG arranged in a linear array. The array is implemented as a single low cost chip available commercially as NEL NLB6202. The AND gates control access to the microstrip delay lines. The delay lines are accurately stepped in delays equal to the channel separation of the LAN. For a system operating at 40 Gbit/s, the channel delay t equals 25 ps. The AND gates are controlled via an input from a demultiplexer 54. In this example the demultiplexer is an NL4705 device manufactured by NEL. The demultiplexer converts an incoming serial delay select word generated by the PC connected to the node into an appropriate gating signal for the AND gate array and thereby selects the appropriate delay.

The electrical channel selector produces at its output a stepped sine wave. This may then be amplified and suitably shaped in order to generate the appropriate drive signal required for the next stage. The next stage may be, for example, an EAM, or a laser diode. If the pulses output by the ECS require shortening to drive the next component, then an electrical impulse generator may be used. A suitable coaxial step recovery diode comb generator is available commercially as ELISRA series MW15900. Given that electronic clock recovery can be carried out with sub-picosecond temporal jitter and microstrip delay lines can be controlled to picosecond accuracy, it is potentially possible to use such an electrical channel selector at rates as high as 100 Gbit/s.

Figure 6:
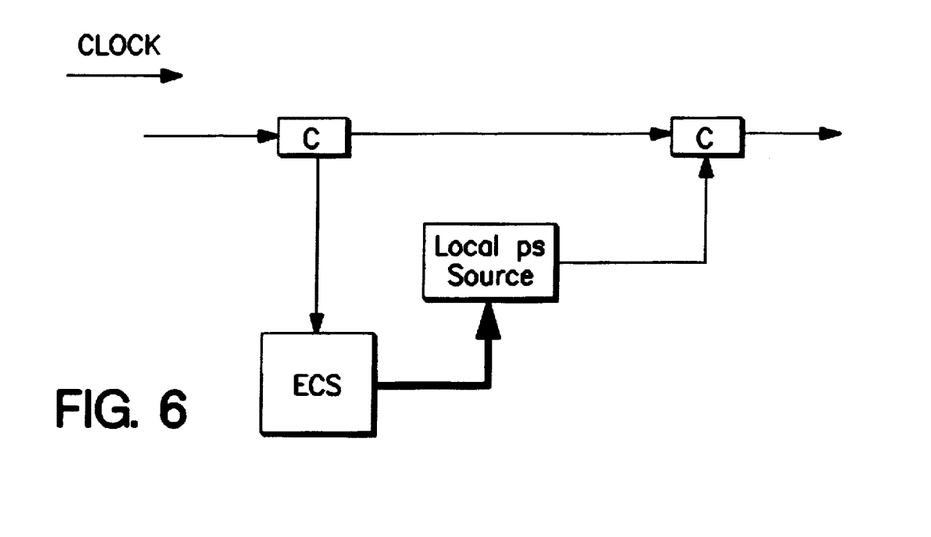
FIG. 6 is a diagram illustrating the use of the electrical channel selector with a local optical source.
Figure 7:
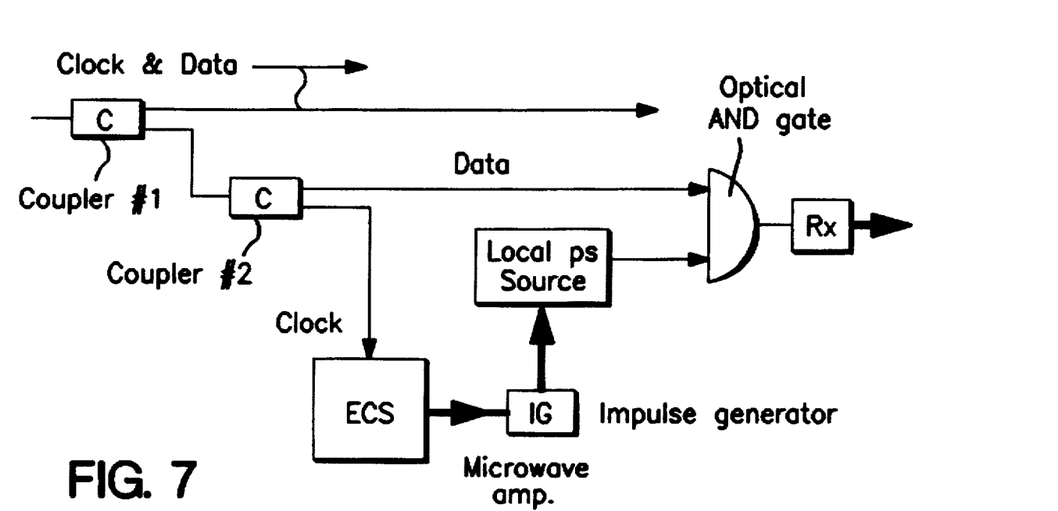
FIG. 7 is a detailed schematic of a receiver based on the topology of FIG. 6.

Although the circuit of FIG. 4 uses an EAM, the ECS might alternatively be used in combination with a local optical source. With such a source, the ECS may be used either in the transmitter for programmable channel insertion (FIG. 6), or in the receiver for channel dropping (FIG. 7). In the case of channel dropping, the output of the local picosecond pulse laser is combined with the data in an optical AND gate. Advances in picosecond pulse lasers in recent years are such that it is possible to generate stable picosecond duration optical pulses using semiconductor based active media. One example of such a laser is a gainswitched DFB laser followed by chirp compensation as described in our above-cited copending application. This provides a simple reliable source of picosecond duration pulses at flexible repetition rates from MHz to 10 s of GHz. In the present example, such a source is driven by the output of the ECS after broadband amplification and using an impulse generator. The resulting stream of optical pulses is then used directly to demultiplex the required channel in an optical AND gate. The use of an optical AND gate as a demultiplexer is described in detail in the present Applicant's earlier International Application no. PCT/GB 95/00425, filed 28th Feb. 1995. The wavelength of the source depends on the design of the optical AND gate, but is not at all restricted to be the same as the data wavelength. The optical AND gate may be an SLA-NOLM or may be an integrated semiconductor-based device.

Referring to FIGS. 4 and 5, an exemplary receiver for a node in an optical TDMA network includes input 51 for an optical clock signal, detector 52 for converting the clock signal to the electrical domain, a variable delay stage 53 for applying a selected delay to the clock signal in electrical domain, and a non-linear electro-optic modulator 41 having an optical input 410 arranged to receive a TDMA datastream and an electrical control input 411 connected to the output of the variable delay stage. In use, the electro-optic modulator 41 outputs a TDMA channel selected by setting the delay of the variable delay stage 53. The electro-optic modulator 41 may be an electro-absorption modulator (EAM). The receiver may also include coupler 42 for separating the clock signal in the optical domain from the received TDMA datastream. For example, coupler 42 may include a polarising beam splitter, in use the clock signal being marked by a different polarisation to the TDMA datastream.

In this exemplary embodiment, a first output of the coupler 42 is connected to the optical input of the electro-optic modulator 41. In use, TDMA data passes from the first output to the modulator. A second output of the coupler is connected to the detector 52. In use, optical clock signals pass from the second output to the detector.

An impulse generator 43 may be connected between the output of the variable delay stage 53 and the control input of the electro-optic modulator 41. The variable delay stage may include a plurality of logic gates (LG), microstrip input (MSI) connecting a first input of each gate to an input path for the clock signal, a controller (e.g., demultiplexer 54) connected to a second input of each gate, and microstrip output (MSO) connecting outputs of the gates in common to an output path for the delayed clock signal. The microstrip lines connecting inputs and outputs of the gates to respective inputs and output paths are arranged to provide paths of different respective lengths via different gates. In use, the controller 54 applies control signals to the gates to select a path and a corresponding delay for the clock signal.

The exemplary receiver for a node in an optical network has a particularly novel variable delay stage 53 that includes a plurality of logic gates (LG), an input line (MSI) connecting a first input of each gate to an input path for the clock signal, a controller 54 connected to a second input of each gate, and an output line (MSO) connecting outputs of the gates in common to an output path for the delayed clock signal. The lines connecting inputs and outputs of the gates to respective input and output paths are arranged to provide paths of different respective lengths via different gates. In use, controller 54 applies control signals to the gates to select a path and a corresponding delay for the clock signal. At least one of the lines for connecting (MSI, MSO) may include a microstrip delay line. The lines for connecting (MSI, MSO) may include a pair of microstrip delay lines with the gates connected between the pair of microstrip delay lines. Adjacent connections to the gates on the microstrip delay lines (MSI, MSO) on the input side of the gates are, in the exemplary embodiment, separated by a path length corresponding to a delay of t/2 and connections on the microstrip delay line on the output sides of the gates are separated by a path length corresponding to a delay of t/2, in use the gates being controlled to vary the delay by multiples of t, where t corresponds to the channel spacing in the time domain of the OTDM signal.

An optical network may include the exemplary receiver. Indeed, a local area network (LAN 1; FIG. 1) may interconnect a plurality of computer systems (PC1, PC2, . . . ) and include an optical network with the exemplary receiver.

A method of operating a receiver at a node of an optical TDMA network may include: receiving a TDMA datastream and an associated optical clock signal, detecting the optical clock signal thereby converting it to the electrical domain, applying a variable delay to the clock signal in the electrical domain, passing the TDMA datastream through a non-linear electro-optic modulator, and controlling the modulator in dependence upon the delayed clock signal, the modulator thereby outputting a selected one or more TDMA channels. The modulator in this method may be an electro-absorption modulator.

Figure 8:
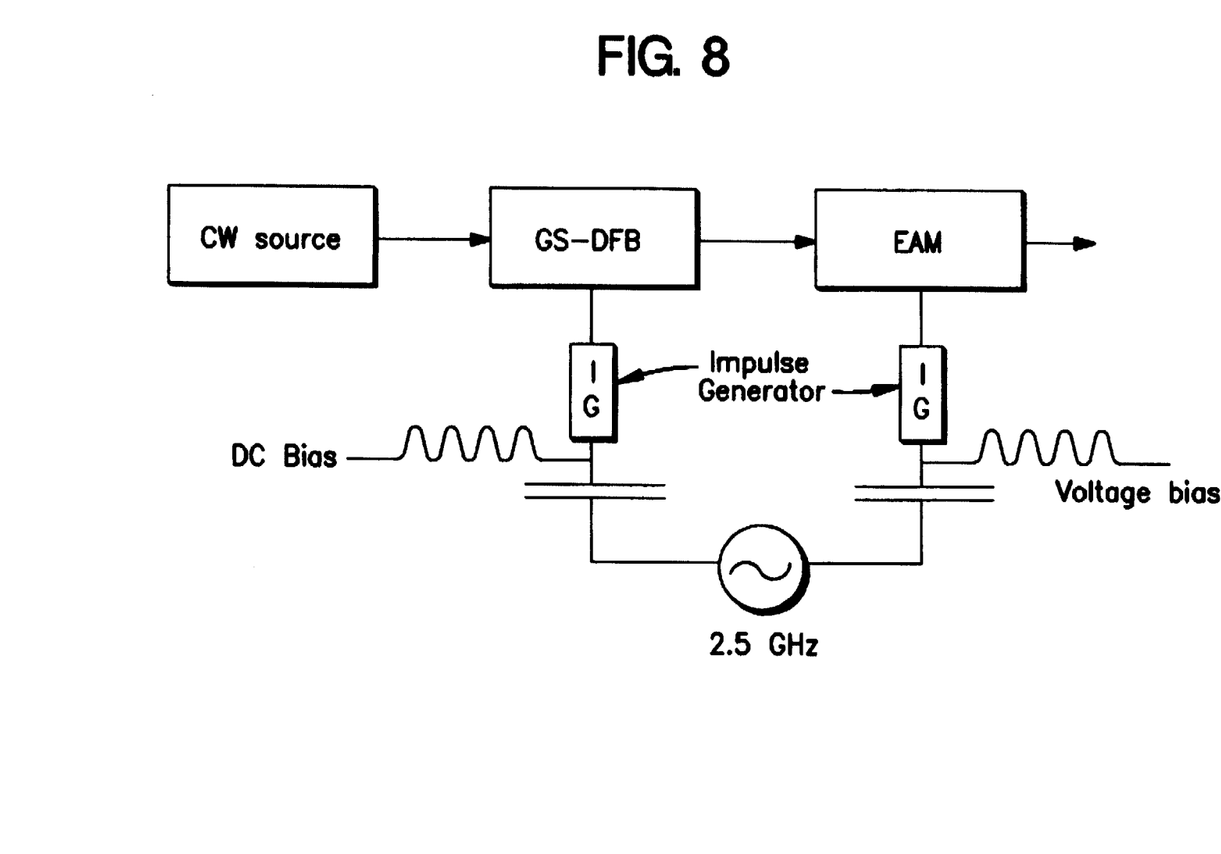
FIG. 8 is a schematic of a pulse source.

FIG. 8 is a schematic diagram of a pulse source suitable for use in the exemplary embodiments and is believed to be self-explanatory in light of the above discussion.

What is claimed is:

1. A receiver for a node in an optical TDMA network said receiver comprising:

an input for an optical clock signal, a detector for converting the clock signal to an electrical domain signal, a variable delay stage for applying a selected delay to the clock signal in electrical domain, and a non-linear electro-optic modulator having an optical input arranged to receive a TDMA datastream and an electrical control input connected to the output of the variable delay stage, in use the electro-optic modulator outputting a TDMA channel selected by setting the delay of the variable delay stage.

2. A receiver as in claim 1, in which the electro-optic modulator is an electro-absorption modulation.

3. A receiver as in claim 1, including means for separating the clock signal in the optical domain from the received TDMA datastream.

4. A receiver as in claim 3, in which:

said means for separating comprises a polarising beam splitter, in use the clock signal being marked by a different polarisation to the TDMA datastream.

5. A receiver as in claim 3, in which:

a first output of the means for separating is connected to the optical input of the electro-optic modulator, in use TDMA data passing from the first output to the modulator, and a second output of the means for separating is connected to the detector, in use optical clock signals passing from the second output to the detector.

6. A receiver as in claim 1 further comprising:

an impulse generator connected between the output of the variable delay stage and the control input of the electro-optic modulator.

7. A receiver as in claim 1 in which the variable delay stage comprises:

a plurality of logic gates, means connecting a first input of each gate to an input path for the clock signal, control means connected to a second input of each gate, and means connecting outputs of the gates in common to an output path for the delayed clock signal, said means connecting inputs and outputs of the gates to respective inputs and output paths being arranged to provide paths of different respective lengths via different gates, in use the control means applying control signals to the gates to select a path and a corresponding delay for the clock signal.

8. A receiver for a node in an optical network, said receiver comprising:

an input for an optical clock signal, a detector for converting the clock signal to an electrical domain signal, a variable delay stage for applying a selected delay to the clock signal in the electrical domain, and a switch controlled in dependence upon the delayed clock signal and arranged to select one or more channels from an TDMA datastream, the variable delay stage including:

a plurality of logic gates, means for connecting a first input of each gate to an input path for the clock signal, control means connected to a second input of each gate, and means connecting outputs of the gates in common to an output path for the delayed clock signal, said means for connecting inputs and outputs of the gates to respective input and output paths being arranged to provide paths of different respective lengths via different gates, in use the control means applying control signals to the gates to select a path and a corresponding delay for the clock signal.

9. A receiver as in claim 8 in which at least one of said means for connecting comprises a microstrip delay line.

10. A receiver as in claim 9 in which the means for connecting comprises a pair of microstrip delay lines and the gates are connected between the pair of microstrip delay lines.

11. A receiver as in claim 10, in which:

adjacent connections to the gates on the microstrip delay lines on the input side of the gates are separated by a path length corresponding to a delay of t/2 and connections on the microstrip delay line on the output sides of the gates are separated by a path length corresponding to a delay of t/2, in use the gates being controlled to vary the delay by multiples of t, where t corresponds to the channel spacing in the time domain of the OTDM signal.

12. An optical network including a receiver as in claim 1.

13. A local area network interconnecting a plurality of computer systems and comprising an optical network as in claim 12.

14. A method of operating a receiver at a node of an optical TDMA network, said method comprising the steps of:

receiving a TDMA datastream and an associated optical clock signal, detecting the optical clock signal thereby converting it to an electrical domain signal, applying a variable delay to the clock signal in the electrical domain, passing the TDMA datastream through a non-linear electro-optic modulator, and controlling the modulator in dependence upon the delayed clock signal, the modulator htereby outputting a selected one or more TDMA channels.

15. A method as in claim 14 in which the modulator is an electro-absorption modulator.

16. A TDMA receiver channel selector comprising:

an input signal line connected to receive a clock signal;

an output signal line connected to output a selectively delayed clock signal;

a plurality of logic gates connected between said input and output signal lines at respectively corresponding intervals along at least one of these lines, the connections providing paths of different respective lengths via different gates; and a control circuit connected to respective control inputs of the gates to select each of plural different length paths via said gates and thereby to select correspondingly different time delays for input clock signals.

17. A TDMA receiver channel selector as in claim 16 wherein at least one of said input and output signal lines comprise a microstrip delay line.

18. A TDMA receiver channel selector as in claim 17 wherein said input and output signal lines each comprise a microstrip delay line.

19. A TDMA receiver channel selector as in claim 18 wherein:

adjacent connections on the microstrip delay lines on the input side of the gates are separated by a path length corresponding to a delay of t/2 and connections on the microstrip delay line on the output sides of the gates are separated by a path length corresponding to a delay of t/2, the gates being controlled to vary the delay by multiples of t, where t corresponds to channel spacing in the TDMA time domain signal.

\* \* \* \* \*